Patented May 17, 1949

2,470,739

UNITED STATES PATENT OFFICE 2,470,739

CARBOXYTHIOPHANES AND METHOD OF PREPARING SAME

Bernard R. Baker, Nanuet, N. Y., assignor, by mesne assignments, to American Cyanamid Company, New York, N. Y., a corporation of Maine No Drawing. Application July 16, 1945, Serial No. 605,468

6 Claims. (Cl. 260—329)

The present invention relates to new organic compounds and methods of preparing the same. More particularly, it relates to mono- and di-esters of di- and tricarboxy thiophanes.

In accordance with the present invention, new thiophane derivatives can be obtained having the following general formula:

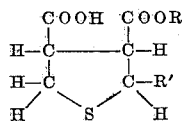

wherein R is an alkyl radical and R' is a carbalkoxyalkyl radical.

I prepare the compounds of the present invention by mixing a thiophane tricarboxylic acid ester, an organic solvent, water and substantially one equivalent of an alkali.

The compounds of the present invention are in general oils. They are soluble in organic solvents such as benzene, chloroform, carbon tetrachloride and the like and in aqueous alkali. They are insoluble in water.

The thiophane tri-esters used as intermediates in the present invention can be prepared from the corresponding thiophane tri-acids which in turn can be prepared by methods shown in the specific examples.

Among the intermediates which I can use the following may be mentioned specifically 2-(delta-carbomethoxybutyl) - 3,4 - dicarbomethoxy-thiophane; 2-(delta-carbethoxybutyl) - 3,4 - dicarbethoxythiophane; 2 - (gamma - carbomethoxypropyl)-3,4-dicarbomethoxythiophane; 2-(gamma - carbethoxypropyl) - 3,4 - dicarbethoxythiophane; 2 - (beta-carbomethoxyethyl) - 3,4 - dicarbomethoxythiophane; 2 - (beta - carbethoxyethyl) - 3,4 - dicarbethoxythiophane; 2 - carbomethoxymethyl - 3,4 - dicarbomethoxythiophane; 2 - carbethoxymethyl-3,4-dicarbethoxythiophane; and the like.

I have found, unexpectedly, that the 4 carbalkoxy group of these compounds can be selectively hydrolyzed to yield compounds having a free carboxy group at the 4 position without hydrolysis of the remaining ester groups. This is particularly surprising in those compounds having a carbalkoxyalkyl group at the 2 position as it would normally be expected that this group would hydrolyze first. The resulting compounds are particularly useful in that they may be reacted with thionyl chloride to form an acid chloride. The acid chloride can be made to undergo a Curtius rearrangement, forming compounds useful in the synthesis of biotin.

The reaction used in preparing compounds of the present invention can be carried out at temperatures between about 25° C. and 100° C. or higher. A convenient method of conducting the reaction is to mix the reactants in a suitable solvent or diluent and heat the reaction mixture under a reflux condenser until the reaction is complete, a matter of minutes, usually from about ten minutes to about sixty minutes. When the reaction is carried out at room temperature it may be complete in from about 12 to about 24 hours, and although the reaction mixture is allowed to stand several days no further hydrolysis takes place after the alkali has all reacted.

In carrying out the present invention I can use any water miscible, neutral, oxygenated organic solvent, such as, methanol, ethanol, propanol, acetone, dioxane, etc.

I prefer to add the alkali, such as sodium hydroxide, potassium hydroxide, sodium carbonate, potassium carbonate, etc. in the form of an aqueous solution so that a small amount of water is also present in the reaction mixture. One equivalent of alkali is added in order that one ester group only be removed from the tri-ester used in the reaction.

When the reaction is complete, the reaction mixture is diluted with an aqueous solution of mild alkali, such as saturated sodium bicarbonate solution. The mixture is then extracted with a solvent such as benzene, chloroform or ether to remove any unreacted starting material. The aqueous alkaline solution is acidified and the free thiophane-4-carboxylic acid which separates is extracted with a solvent such as benzene. The extracts are washed and dried. Upon removal of the solvent the products are generally obtained as oils. The products may be characterized by conversion to the N-methylaniline or aniline derivatives or by similar methods.

My invention will now be illustrated in greater detail by means of the following specific examples in which representative di- and tri-esters of thiophane carboxylic acids are selectively hydrolyzed to thiophane monocarboxylic acids. It will be understood, of course, that these examples are given for purposes of illustration and are not to be considered as limiting my invention to the particular details described therein.

*Example 1*

To a mixture of 55 g. of 2-(delta-carbomethoxybutyl) - 3 - keto - 4 - carbomethoxythiophane (prepared by the method of Karrer et al., Helv.

Chim. Acta, 27, 237–246 (1944)) and 20 cc. of liquid hydrogen cyanide at 0° C. was added 0.3 cc. of 50% potassium hydroxide. After 16 hours at 0° C., the mixture was acidified with 1 cc. of 85% phosphoric acid and the volatile material removed in vacuo, finally at 100° C. a yield of 63 g. of 2-(delta-carbomethoxybutyl)-3-hydroxy-3-cyano-4-carbomethoxythiophane was obtained as a nearly colorless oil which partially crystallized on standing.

A solution of 62.5 g. of the cyanohydrin prepared immediately above in 100 cc. of benzene was dried with anhydrous sodium sulfate and the drying agent rinsed with 50 cc. of benzene. To the solution diluted with 150 cc. of reagent pyridine was added 43 cc. of phosphorus oxychloride. The temperature gradually rose to 40° C. and was occasionally cooled to maintain the temperature at 40° C.–48° C. After six hours the mixture was poured on ice. The separated organic layer, washed successively with dilute hydrochloric acid, aqueous sodium bicarbonate and dilute hydrochloric acid was then distilled. A yield of 41 g. of 2-($\delta$-carbomethoxybutyl)-3-cyano-4-carbomethoxy-4,5-dihydrothiophene was obtained as a yellow oil, boiling point 192°–198° C. (1 mm.).

A solution of 29.2 g. of the intermediate above in 90 cc. of acetic acid and 150 cc. of concentrated hydrochloric acid was refluxed for sixteen hours, then evaporated to dryness in vacuo. The residue was extracted with 300 cc. of hot acetone, filtered from ammonium chloride and the extract evaporated to dryness in vacuo. A quantitative yield of 2-($\delta$-carboxybutyl)-4,5-dihydrothiophene-3,4-dicarboxylic acid was obtained as a semi-crystalline mass.

A solution of 23.5 g. of 2-($\delta$-carboxybutyl)-4,5-dihydrothiophene-3,4-dicarboxylic acid in 106 cc. of 10% sodium hydroxide and 140 cc. of water was stirred with 265 g. of 2% sodium amalgam at 70°–80° C. (bath temp.) for one hour. The decaned solution was acidified, saturated with sodium chloride and extracted with two 250 cc. portions of ethyl acetate. The extracts, dried with anhydrous magnesium sulfate, were evaporated to dryness and the semi-crystalline residue (22.5 g.) recrystallized from 1:4 ethyl acetate-benzene mixture. A yield of 11.4 g. (49%) of 2-($\delta$-carboxybutyl)-thiophane-3,4-trans dicarboxylic acid was obtained.

A mixture of 20.6 g. of 2-($\delta$-carboxybutyl)-thiophane-3,4-trans-dicarboxylic acid, 125 cc. of methanol, 175 cc. of chloroform and 5 cc. of concentrated sulfuric acid was refluxed for sixteen hours under a Soxhlet apparatus containing anhydrous magnesium sulfate in the thimble. The solution was washed with several volumes of water containing excess sodium bicarbonate. After distillation of the chloroform 22.5 g. (94%) of 2 - ($\delta$-carbomethoxybutyl) - 3,4 - trans-dicarbomethoxythiophane remained as an oil.

To a solution of the above trimethyl ester in 110 cc. of methanol was added 31 cc. of 10% sodium hydroxide. After a minimum of sixteen hours at room temperature, the solution was concentrated to about one-half its volume, diluted with 100 cc. of water and 300 cc. of saturated sodium bicarbonate solution and extracted with benzene. The benzene extract on evaporation gave a small amount of unchanged triester. The alkaline solution was acidified and extracted with benzene. The extract, washed with dilute hydrochloric acid, was evaporated leaving 17.6 g. (69%) of 2-($\delta$-carbomethoxybutyl)-3-carbomethoxythiophane-4-carboxylic acid.

Example 2

To a solution of 0.5 g. of 2-($\delta$-carbomethoxybutyl)-3,4-dicarbomethoxythiophane (prepared as in Example 1) in 10 cc. of methanol was added 0.57 cc. of 10% sodium hydroxide. The solution was refluxed for twenty minutes, then most of the methanol evaporated. It was diluted with benzene and aqueous sodium bicarbonate. The aqueous sodium bicarbonate solution was separated and acidified. The oil which separated was extracted with benzene and the benzene then removed. A yield of 0.27 g. of 2-($\delta$-carbomethoxybutyl) - 3 - carbomethoxy-trans-4-carboxythiophane was obtained as an oil. The product was characterized by conversion to the anilied diester by means of the acid chloride in the usual manner. Melting point 118–124° C.

Example 3

A mixture of 1 g. of 2-($\delta$-carbomethoxybutyl)-3,4-dicarbomethoxythiophane, 0.382 g. of reagent sodium carbonate, 20 cc. of methanol and 10 cc. of water was shaken at room temperature for two days. At this time the reaction mixture was homogeneous. Water and benzene were added and the reaction mixture was transferred to a separatory funnel. The alkaline water layer was acidified with cold dilute hydrochloric acid and was extracted three times with benzene. The benzene extract was washed three times with saturated saline and was dried with magnesium sulfate. On evaporation 0.5 g. of the product was obtained as an oil. A total yield of 52.5% of 2-($\delta$-carbomethoxybutyl) - 3 - carbomethoxy-thiophane-4-carboxylic acid was obtained.

I claim:

1. Compounds of the group consisting of those represented by the following general formula:

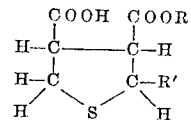

wherein R is an alkyl radical and R' is a carbalkoxyalkyl radical.

2. 2 - (delta - carbobethoxybutyl) - 3 - carbomethoxy-4-carboxythiophane.

3. 2-(delta - carbethoxybutyl)-3-carbethoxy-4-carboxythiophane.

4. A method of preparing compounds having the formula:

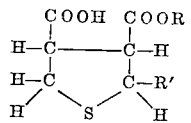

wherein R is an alkyl radical and R' is a carbalkoxyalkyl radical which comprises mixing a compound having the formula:

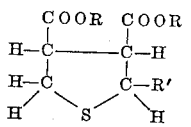

wherein R and R' are as defined above, with one mol of an alkali metal hydroxide in the presence of a water miscible alcohol solvent for said dicarbalkoxythiophane and water, and allowing the reactants to remain together until the 4-carbalkoxy thiophane is converted into an alkali metal salt of the 4-carboxythiophane, acidifying and recovering the said 4-carboxythiophane therefrom.

5. A method of preparing 2-(delta-carbomethoxybutyl)-3-carbomethoxy-4-carboxythiophane which comprises mixing 2-(delta-carbomethoxybutyl)-3,4-dicarbomethoxythiophane with an alkali metal hydroxide in the presence of a water miscible, neutral organic solvent for said dicarbomethoxythiophane and water, subsequently acidifying and recovering the said 4-carboxythiophane therefrom.

6. A method of preparing 2-(delta-carbethoxybutyl)-3-carbethoxy-4-carboxythiophane which comprises mixing 2-(delta-carbethoxybutyl)-3,4-dicarbethoxythiophane with an alkali metal hydroxide in the presence of a water miscible, neutral organic solvent for said dicarbethoxythiophane and water, subsequently acidifying and recovering the said 4-carboxythiophane therefrom.

BERNARD R. BAKER.

REFERENCES CITED

The following references are of record in the file of this patent:

UNITED STATES PATENTS

| Number | Name | Date |
| --- | --- | --- |
| 2,382,418 | Hoffmann | Aug. 14, 1945 |
| 2,400,436 | Patterson | May 14, 1946 |
| 2,417,326 | Schnider | Mar. 11, 1947 |

OTHER REFERENCES

Whitmore: "Organic Chemistry", p. 453, Van Nostrand, N. Y., 1937.

Karrer: "Organic Chemistry", p. 247, Nordeman, N. Y., 1948.

Weygard: "Organic Preparations", p. 171, Interscience Pub., N. Y., 1945.